US011434836B2

(12) United States Patent
Baltrucki

(10) Patent No.: US 11,434,836 B2
(45) Date of Patent: Sep. 6, 2022

(54) COMBINED POSITIVE POWER AND CYLINDER DEACTIVATION OPERATION WITH SECONDARY VALVE EVENT

(71) Applicant: Jacobs Vehicle Systems, Inc., Bloomfield, CT (US)

(72) Inventor: Justin D. Baltrucki, Canton, CT (US)

(73) Assignee: Jacobs Vehicle Systems, Inc., Bloomfield, CT (US)

(*) Notice: Subject to any disclaimer, the term of this patent is extended or adjusted under 35 U.S.C. 154(b) by 0 days.

(21) Appl. No.: 16/947,505

(22) Filed: Aug. 4, 2020

(65) Prior Publication Data
US 2021/0040902 A1    Feb. 11, 2021

Related U.S. Application Data

(60) Provisional application No. 62/883,071, filed on Aug. 5, 2019.

(51) Int. Cl.
*F02D 13/06*    (2006.01)
*F02D 13/02*    (2006.01)

(52) U.S. Cl.
CPC ......... *F02D 13/06* (2013.01); *F02D 13/0203* (2013.01); *F02D 2200/021* (2013.01); *F02D 2200/023* (2013.01); *F02D 2200/0802* (2013.01)

(58) Field of Classification Search
CPC .......... F02D 13/04; F02D 13/06; F02D 13/08; F02D 13/0203; F02D 2200/0802;
(Continued)

(56) References Cited

U.S. PATENT DOCUMENTS

| 4,572,114 A | * | 2/1986 | Sickler | F01L 13/065 |
| | | | | 123/90.15 |
| 4,592,319 A | * | 6/1986 | Meistrick | F02D 13/04 |
| | | | | 123/90.12 |

(Continued)

FOREIGN PATENT DOCUMENTS

| EP | 0961018 B1 | 3/2010 |
| EP | 2959122 B1 | 1/2018 |

(Continued)

OTHER PUBLICATIONS

International Search Report for International Application No. PCT/IB2020/057372 dated Sep. 24, 2020, 3 pages.

(Continued)

*Primary Examiner* — Sizo B Vilakazi
*Assistant Examiner* — Brian R Kirby
(74) *Attorney, Agent, or Firm* — Moreno IP Law LLC

(57) ABSTRACT

An internal combustion engine comprises a plurality of cylinders, including at least one de-activatable cylinder having at least one deactivator assembly operatively connected to the at least one valve train for the de-activatable cylinder. In such an internal combustion engine, a method for actuating engine valves comprises operating at least one cylinder of the plurality of cylinders to provide positive power generation according to the main valve actuations and, additionally, placing the at least one deactivator assembly for a de-activatable cylinder of the at least one de-activatable cylinder in a deactivation state. While the at least one deactivator assembly for the de-activatable cylinder is in the deactivation state and while the at least one cylinder is operating to provide positive power generation according to main valve actuations, the method further comprises performing at least one secondary valve event via at least one engine valve for the de-activatable cylinder.

7 Claims, 9 Drawing Sheets

(58) Field of Classification Search
CPC ......... F02D 2200/023; F02D 2200/021; F02D 41/006; F02D 41/0087; F02D 41/1446; F02D 13/0273
See application file for complete search history.

(56) References Cited

U.S. PATENT DOCUMENTS

| | | | | |
|---|---|---|---|---|
| 5,226,401 | A * | 7/1993 | Clarke | F02M 26/41 123/90.11 |
| 5,934,263 | A * | 8/1999 | Russ | F02M 26/01 123/698 |
| 6,263,841 | B1 * | 7/2001 | Beveridge | F02B 33/30 123/65 A |
| 6,332,446 | B1 * | 12/2001 | Matsumoto | F02D 41/0087 123/90.11 |
| 6,983,725 | B2 * | 1/2006 | Persson | F01L 13/06 123/90.39 |
| 7,284,533 | B1 * | 10/2007 | Huang | F02D 9/06 123/321 |
| 7,565,896 | B1 * | 7/2009 | Yang | F02D 13/04 123/90.23 |
| 7,801,664 | B2 * | 9/2010 | Winstead | F02M 26/43 123/90.15 |
| 7,823,559 | B2 * | 11/2010 | Bohme | F01L 13/06 123/321 |
| 8,074,629 | B2 * | 12/2011 | Winstead | F02D 13/0219 123/90.15 |
| 8,205,583 | B2 * | 6/2012 | Winstead | F02D 41/008 123/58.8 |
| 8,651,073 | B2 * | 2/2014 | Cecur | F01L 13/0015 123/90.16 |
| 8,851,048 | B2 | 10/2014 | Meistrick | |
| 8,936,006 | B2 * | 1/2015 | Groth | F01L 13/0005 123/90.43 |
| 8,955,498 | B2 * | 2/2015 | Kerns | F02D 41/1441 123/481 |
| 8,967,120 | B2 * | 3/2015 | Furukawa | F02D 17/02 123/481 |
| 9,790,824 | B2 | 10/2017 | Baltrucki et al. | |
| 2005/0131618 | A1 * | 6/2005 | Megli | F02D 13/0257 701/101 |
| 2006/0005807 | A1 * | 1/2006 | Megli | F02D 13/04 123/90.11 |
| 2008/0230021 | A1 | 9/2008 | Perrson | |
| 2008/0264392 | A1 * | 10/2008 | Sahlen | F01L 1/181 123/321 |
| 2009/0013969 | A1 * | 1/2009 | Winstead | F02D 41/006 123/481 |
| 2011/0107986 | A1 * | 5/2011 | Winstead | F02D 41/006 123/90.15 |
| 2011/0277729 | A1 * | 11/2011 | Afjeh | F02D 13/04 123/321 |
| 2014/0014066 | A1 * | 1/2014 | Yacoub | F02D 41/0235 701/103 |
| 2014/0020644 | A1 * | 1/2014 | Roberts | F01L 1/18 123/90.46 |
| 2014/0026872 | A1 * | 1/2014 | Kerns | F02B 47/08 123/90.15 |
| 2014/0083381 | A1 * | 3/2014 | Roberts | F01L 1/08 123/90.15 |
| 2014/0245992 | A1 | 9/2014 | Groth et al. | |
| 2015/0159521 | A1 * | 6/2015 | Baltrucki | F01L 1/24 123/90.12 |
| 2015/0267575 | A1 * | 9/2015 | Nakamura | F01L 13/0036 123/90.16 |
| 2018/0051601 | A1 * | 2/2018 | Foster | F01L 13/0005 |
| 2018/0106204 | A1 * | 4/2018 | McCarthy, Jr. | F02D 13/06 |
| 2019/0040826 | A1 * | 2/2019 | McCarthy, Jr. | F02D 41/0077 |
| 2019/0309664 | A1 * | 10/2019 | Batcheller | F02D 13/04 |

FOREIGN PATENT DOCUMENTS

| | | | | |
|---|---|---|---|---|
| GB | 2119853 | A | | 11/1983 |
| GB | 2367859 | A * | 4/2002 | ......... F01L 13/0005 |
| JP | H06207540 | A | | 7/1994 |
| JP | H07119502 | A | | 5/1995 |
| JP | 2006200414 | A | | 8/2006 |
| KR | 101756722 | B1 | | 7/2017 |

OTHER PUBLICATIONS

Written Opinion of the International Searching Authority for International Application No. PCT/IB2020/057372 dated Sep. 24, 2020, 4 pages.

* cited by examiner

COMBINED POSITIVE POWER AND CYLINDER DEACTIVATION OPERATION WITH SECONDARY VALVE EVENT

FIELD

The instant disclosure relates generally to cylinder deactivation for internal combustion engines and, in particular, to the control of internal combustion engines to provide combined operation of positive power generation cylinders and deactivated cylinders with one or more secondary valve events.

BACKGROUND

Cylinder deactivation (CDA) refers to techniques for discontinuing positive power production by a cylinder in an internal combustion engine, frequently for the purpose of reducing fuel consumption during cold engine startup, low load operation or during other engine operating states. In such startup scenarios, it is known to operate a portion of the available engine cylinders in a positive power generation (i.e., fueled) mode and to operate others of the available cylinders in a CDA mode. Combined with cutting off fueling to a cylinder, techniques for cylinder deactivation known in the art typically utilize a control solenoid for each cylinder that is to be deactivated. In such systems, a hydraulically-controlled, deactivation component in an engine valve valvetrain (e.g., a lifter, rocker arm, valve bridge, etc.) is typically provided that may be switched between an active/locked/un-collapsed state where engine valve actuation motions normally used to provide positive power production (sometimes referred to as "main" valve events) are conveyed to the engine valves, and an inactive/unlocked/collapsed state where such valve actuation motions are not conveyed to the engine valves, thereby effectively deactivating the corresponding cylinder. Additionally, it is also known to provide auxiliary valve events to engine valves, where the "auxiliary" descriptor refers to other engine valve motions for purpose other than positive power generation (e.g., compression release braking, bleeder braking, cylinder decompression, brake gas recirculation (BGR), etc.) or in addition to positive power generation (e.g., internal exhaust gas recirculation (IEGR), variable valve actuations (VVA), Miller/Atkinson cycle, swirl control, etc.).

Additionally, aftertreatment systems that reduce harmful emissions have long been used with internal combustion engines. For proper operation, it is often necessary to maintain such aftertreatment systems at relatively high temperatures through the provision of sufficiently hot exhaust gasses. Testing has shown that, at low load operation, incorporation of CDA does a good job of increasing temperature of exhaust gasses to prevent aftertreatment systems from cooling off too much, i.e., keeping already-heated aftertreatment systems sufficiently warm. However, if CDA is employed at cold engine startup, testing has further shown that the presence of cylinders under CDA operation will reduce the flow rate of exhaust gasses and extend the time for elevating the temperature of the downstream aftertreatment system.

Furthermore, some engines cannot operate cylinders at vacuum without having high levels of oil consumption. Conventional cylinder deactivation often controls operation of cylinders to deactivate in a manner that provides an intake of air just before deactivating the valvetrain, thereby trapping pressurized gas in the cylinders. However, over time, the cylinder pressure decays and the cylinder begins pulling vacuum that, in turn, causes lubrication oil to be drawn into the cylinder and consumed thereby decreasing available oil and creating undesired emissions. An example of this decay is illustrated in FIG. 1, which illustrates average peak cylinder pressure over time for a cylinder having gassed trapped therein at the time of CDA. As illustrated, peak cylinder pressure 102 is relatively constant prior to CDA operation, which is initiated at time $T_0$. However, in the illustrated example, after approximately $T_0+8$ seconds, the trapped gas is eliminated and the cylinder will run in a vacuum when the pressure at piston top dead center (TDC) is lower than the product of ambient pressure and the compression ratio of the engine. For example, cylinder pressure of approximately 16-20 bar at TDC will result in some vacuum being drawn at bottom dead center (BDC). To prevent such pressure decay and accompanying poorly-tolerated vacuums, current systems control the cylinder deactivation to be turned off and back on again, thereby permitting cylinders to "refill" with gasses. To the extent that many CDA systems are hydraulically controlled via solenoids, this constant turning on and off incurs a significant number of power cycles of such solenoids that, in turn, results in premature solenoid wear and failure.

Thus, solutions that facilitate the use of CDA for thermal management or other uses, while overcoming the above-noted shortcomings of prior art techniques, would represent a welcome advancement of the art.

SUMMARY

The instant disclosure describes techniques for operation of cylinders in an internal combustion engine in which cylinders are operated in positive power generation and cylinder deactivation modes at the same time. In an embodiment, an internal combustion engine comprises a plurality of cylinders. In turn, each of the plurality of cylinders comprises at least one engine valve and has at least one main valve actuation motion source associated therewith. The at least one main valve actuation motion source is configured to provide main valve actuations to the at least one engine valve via at least one valve train, where such main valve actuations are sufficient to support positive power generation by the cylinder. Additionally, the plurality of cylinders includes at least one de-activatable cylinder, each of the at least one de-activatable cylinder having at least one deactivator assembly operatively connected to the at least one valve train for the de-activatable cylinder. Each of the at least one deactivator assembly is configured to operate in either an activation state in which the main valve actuations of the at least one engine valve for the de-activatable cylinder are permitted or a deactivation state in which the main valve actuations of the at least one engine valve for the de-activatable cylinder are prohibited. In such an internal combustion engine, a method for actuating engine valves comprises operating at least one cylinder of the plurality of cylinders to provide positive power generation according to the main valve actuations and, additionally, placing the at least one deactivator assembly for a de-activatable cylinder of the at least one de-activatable cylinder in the deactivation state. While the at least one deactivator assembly for the de-activatable cylinder is in the deactivation state and while the at least one cylinder is operating to provide positive power generation according to the main valve actuations, the method further comprises performing at least one secondary valve event via the at least one engine valve for the de-activatable cylinder.

In another embodiment, the internal combustion engine further comprises at least one auxiliary valve actuation motion source that is associated with the de-activatable cylinder, where the at least one auxiliary valve actuation motion source is configured to provide valve actuation motions to the at least one engine valve via the at least one valve train for the de-activatable cylinder. In this system, the at least one secondary valve event may be provided by the at least one auxiliary valve actuation motion source.

In another embodiment, the at least one deactivator assembly for the de-activatable cylinder loses an amount of lift less than a peak lift provided by the main valve actuations when it is operated in the deactivation state. In this case, the at least one secondary valve event may be provided by the main valve actuations via the at least one deactivator assembly for the de-activatable cylinder.

In another embodiment, the at least one engine valve for the de-activatable cylinder comprises at least one exhaust valve or at least one intake valve. The at least one secondary valve event may then be performed by the at least one exhaust valve or the at least one intake valve. Further still, the at least one secondary valve event may comprise a first secondary valve event performed by the at least one exhaust valve and a second secondary valve event performed by the at least one intake valve.

In another embodiment, the at least one secondary valve event may be configured to permit gasses to be drawn into the cylinder, or to permit gasses to be expelled from the cylinder or both.

Further still, the at least one de-activatable cylinder may comprise a first de-activatable cylinder and a second de-activatable cylinder. The at least one secondary valve event may likewise comprise a first secondary valve event applicable to only the first de-activatable cylinder and a second secondary valve event, different from the first secondary valve event, applicable to only the second de-activatable cylinder. In this case, the step of placing the at least one deactivator assembly for the de-activatable cylinder in the deactivation state further comprises placing either the at least one deactivator assembly for either the first or the second de-activatable cylinder in the deactivation state and, additionally, the step of performing the at least one secondary valve event via the at least one engine valve for the de-activatable cylinder further comprises either performing the first secondary valve event via the at least one engine valve for the first de-activatable cylinder or the second secondary valve event via the at least one engine valve for the second de-activatable cylinder.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

Figure 1:
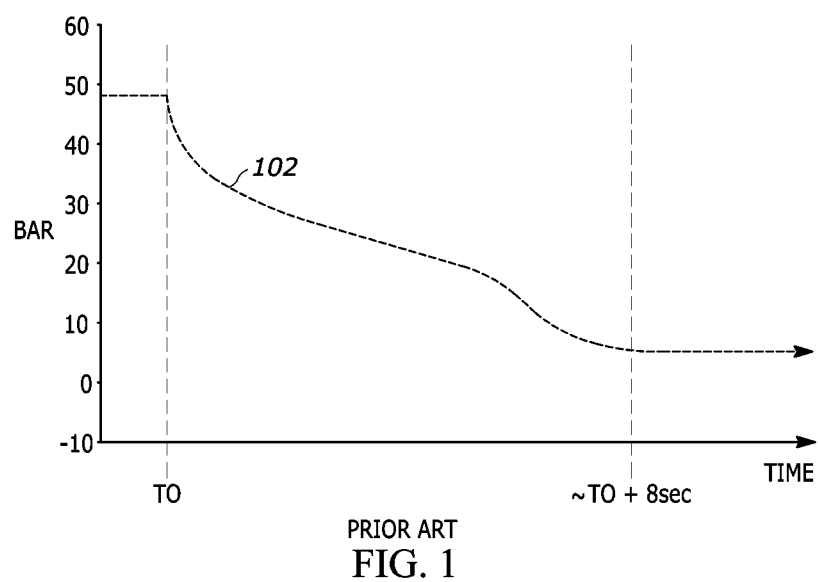
FIG. 1 is a graph illustrating the decay of air pressure in deactivated cylinders in an internal combustion engine in accordance with prior art techniques.
Figure 2:
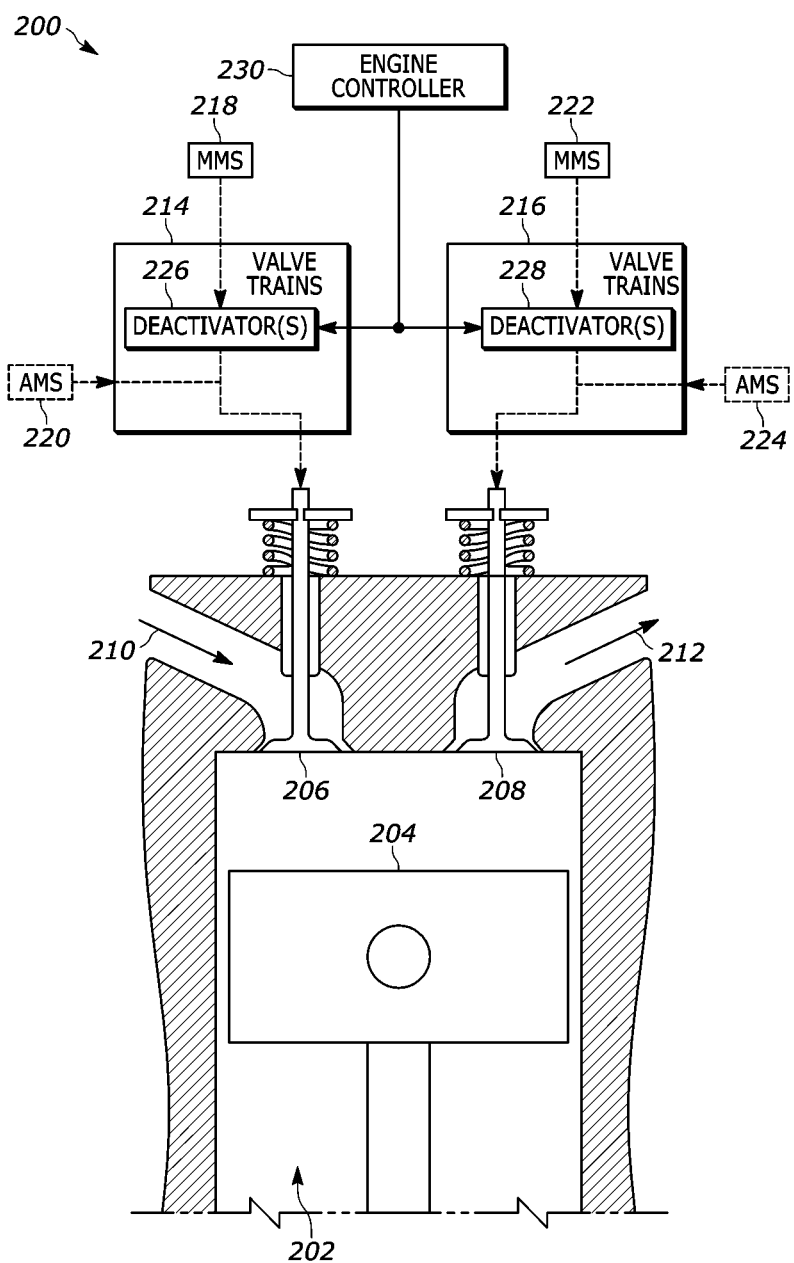
FIG. 2 is a schematic, partial cross-sectional illustration of an internal combustion engine illustrating that may be used to implemented techniques in accordance with the instant disclosure.

FIG. 2 is a partial schematic illustration of an internal combustion engine 200 including a cross-sectional view of an engine cylinder 202 and related valve actuation systems in accordance with the instant disclosure. Although a single cylinder 202 is illustrated in FIG. 2, this is only for ease of illustration and it is appreciated that internal combustion engines often include multiple such cylinders driving a crankshaft (not shown). The engine cylinder 202 has disposed therein a piston 204 and also includes intake valve(s) 206 and the exhaust valve(s) 208 at the top of the cylinder. The piston 204 reciprocates upward and downward repeatedly during positive power operation (i.e., combustion of fuel to drive the piston 204 and the drivetrain), engine braking operation (i.e., use of the piston 204 to achieve air compression and absorb power through the drivetrain) or cylinder deactivation operation (i.e., in an unfueled state and in which no valve actuations are typically applied to the valves 206, 208) of the cylinder 202. The intake valve(s) 206 and the exhaust valve(s) 208 are opened and closed (valve actuations) to provide communication with an intake gas passage 210 and an exhaust gas passage 212, respectively. Valve actuation forces to open the intake valve 206 and exhaust valve 208 are conveyed by respective valve trains 214, 216. In turn, such valve actuation forces (illustrated by the dashed arrows) may be provided by respective main and/or auxiliary motion sources 218, 220, 222, 224 such as rotating cams. As used herein, the descriptor "main" refers to so-called main event engine valve motions, i.e., valve motions used during positive power generation, whereas the descriptor "auxiliary" refers to other engine valve motions for purpose other than positive power generation (e.g., compression release braking, bleeder braking, cylinder decompression, brake gas recirculation (BGR), etc.) or in addition to positive power generation (e.g., internal exhaust gas recirculation (IEGR), variable valve actuations (VVA), Miller/Atkinson cycle, swirl control, etc.).

The valve trains 214, 216 may include any number of mechanical, hydraulic, hydro-mechanical, electromagnetic, or other type of valve train elements known in the art. For example, each of the valve trains 214, 216 may include one or more cam followers, push tubes, rocker arms, valve bridges, etc. used to transfer valve actuation motion to the valves 206, 208. Additionally, one or more lost motion components may be included in either or both valve trains 214, 216 whereby some or all of the valve actuation motions typically conveyed by the valve trains 214, 216 are prevented from reaching the valves 206, 208, i.e., they are "lost." A particular function employing such lost motion is cylinder deactivation.

As noted above, cylinder deactivation refers to techniques for discontinuing positive power production by a cylinder in an internal combustion engine, frequently for the purpose of reducing fuel consumption. In the context of FIG. 2, lost motion components 226, 228, referred to herein as "deactivators," are provided in the respective intake and exhaust valve trains 214, 216 to effectuate cylinder deactivation. Each deactivator 226, 228 is operatively connected to and ultimately controlled by an engine controller 230. The engine controller 234 may comprise any electronic, mechanical, hydraulic, electrohydraulic, or other type of control device for controlling operation of the deactivators 226, 228. For example, the engine controller 230 may be implemented by a microprocessor and corresponding memory storing executable instructions used to implement the required control functions, as known in the art. It is appreciated that other functionally equivalent implementations of the engine controller 230, e.g., a suitable programmed application specific integrated circuit (ASIC) or the like, may be equally employed. Further, the engine controller 230 may be linked to suitable instrumentation to obtain data (to be used in the required control functions) corresponding to various engine operating parameters such as crankshaft position, engine speed, vehicle speed, oil temperature, coolant temperature, manifold (or port) temperature, manifold (or port) pressure, cylinder temperature, cylinder pressure, particulate information, other exhaust gas parameters, driver inputs (such as requests to initiate engine braking), transmission inputs, vehicle controller inputs, engine crank angle, and various other engine and vehicle parameters known to those skilled in the art. Likewise, it is known in the art to implement such deactivators 226, 228 using a hydraulically-controlled component that may be switched between an active/locked/un-collapsed state where engine valve actuations are conveyed to the engine valves (sometimes referred to herein as an "activation state"), and an inactive/unlocked/collapsed state where valve actuation motions are not conveyed to the engine valves (sometimes referred to herein as a "deactivation state"), thereby effectively deactivating the corresponding cylinder.

An example of such a hydraulically-controlled component is illustrated and described in U.S. Pat. No. 9,790,824 (the "'824 patent"), which describes a locking mechanism that is normally in a locked/un-collapsed or motion-conveying state, and that switches to an unlocked/collapsed or motion-absorbing state when hydraulic fluid is applied. Further, each locking mechanism described in the '824 patent may be applied to individual engine valves (e.g., in a rocker arm actuating a single engine valve) or multiple engine valves (e.g., in a valve bridge used to actuate two or more engine valves). Although not shown in FIG. 2 for ease of illustration, the deactivators 226, 228 are typically controlled via one or more deactivator controllers that are typically implemented using a solenoid controlling flow of hydraulic fluid (e.g., motor oil) to the hydraulically-controlled deactivator. In this case, the deactivator controllers (solenoids) are operatively coupled to the engine controller 230 and to the deactivators 226, 228 such that electrical signals provided by the engine controller 230 to the deactivator controllers to operate the deactivator controllers. Regardless, as used herein, the term deactivator assembly collectively refers those components used to implement a deactivator 226, 228 as well as those components required to control operation thereof (e.g., deactivator controllers).

Devices for implementing the valve actuation mechanisms of FIG. 2, and for implementing the various valve lifts described herein, are known in the art. For example, such systems are described in the following patent documents, the teachings of which are incorporated herein by this reference: U.S. Pat. No. 8,851,048 B2; European Patent No. 0961018 B1; and/or European Patent No. 2959122 B1. As will be appreciated by those having skill in the art, these documents each describe systems that may be readily modified to include, for example, the deactivator described in the '824 patent to implement cylinder deactivation, including secondary valve lifts as described in further detail below.

Generally, the instant disclosure describes techniques to improve, in one embodiment, the heat generated in a cylinder deactivation warm-up (engine start) mode by providing one or more valve opening events of the exhaust valve and/or intake valves of deactivated cylinders. As described below, such valve actuation events can increase the pumping work from the deactivated cylinders by increasing the cylinder pressures, and can raise the operating temperature into a more favorable range for engine warmup. Additional embodiments are described for facilitating IEGR operation and/or aftertreatment regeneration.

Figure 3:
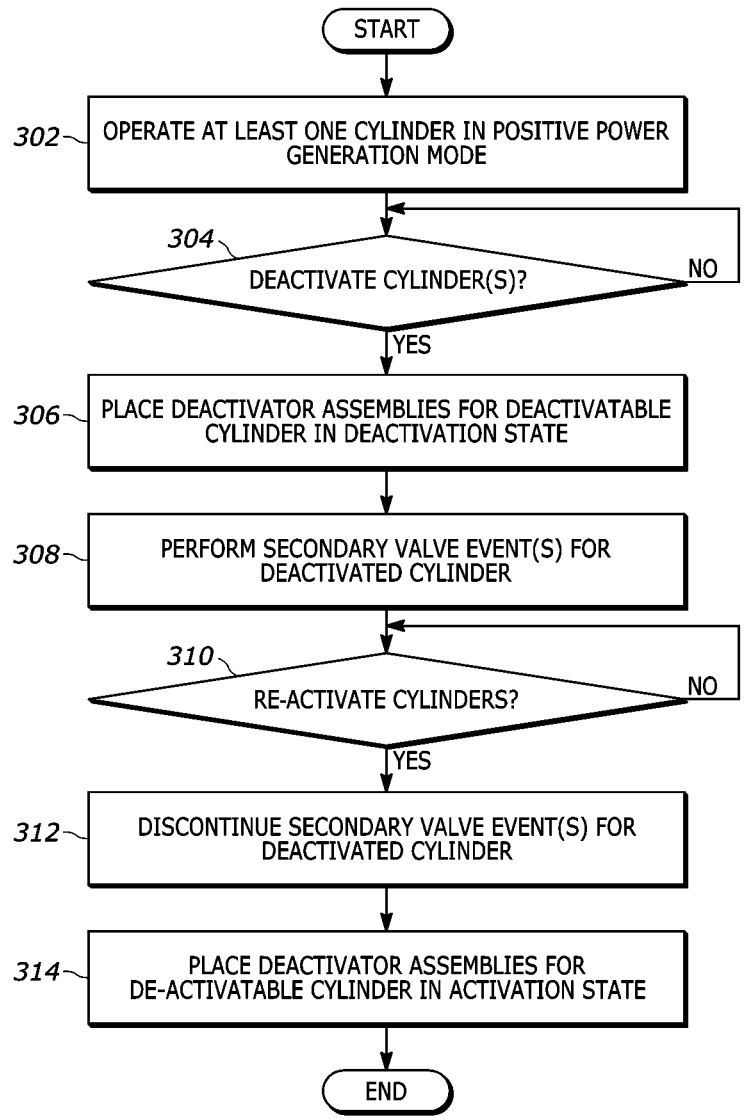
FIG. 3 is a flowchart illustrating a method for controlling engine valve actuations in accordance with the instant disclosure.

FIG. 3 illustrates a flow chart of processing for providing cylinder deactivation operation in accordance with the instant disclosure. In an embodiment, the processing illustrated in FIG. 3 is performed by the engine controller 230 and is preferably implemented in the form of executable instructions, stored in one or more memory devices, that are executed by at least one processing device operatively connected to the memory device(s). Further, the processing illustrate in FIG. 3 is implemented using an internal combustion engine having a plurality of cylinders where each of the cylinders comprises at least one engine valve and has at least one main valve actuation motion source associated therewith. For purposes of the instant disclosure, the at least one engine valve for each cylinder may be one or more exhaust valves, one or more intake valves or both. The at least one main valve actuation motion source is configured to provide main valve actuations to the at least one engine valve via at least one valve train, where such main valve actuations are sufficient to support positive power generation by the cylinder. As used herein, a valve actuation event is sufficient to support positive power generation to the extent that is permits the controlled combustion of fuel in the cylinder. In contrast, a valve actuation event (such as the secondary valve events described herein) is insufficient to support positive power generation by the cylinder to the extent that fuel combustion cannot occur. For example, an intake valve actuation event is sufficient to support positive power generation to the extent that it permits enough fresh air to be drawn into the cylinder to combust enough fuel to displace the piston and provide torque to the crankshaft. Similarly, an exhaust valve actuation event is sufficient to support positive power generation to the extent that it permits expulsion of a sufficient amount of exhaust gases to allow for intake of fresh air during the next intake event.

Additionally, for purposes of the instant disclosure, the plurality of cylinders includes at least one de-activatable cylinder, where each of the at least one de-activatable cylinder has at least one deactivator assembly operatively connected to the at least one valve train for the de-activatable cylinder. To provide for cylinder deactivation, each such deactivator assembly is configured to operate in either an activation state in which the main valve actuations of the at least one engine valve for the de-activatable cylinder are permitted or in a deactivation state in which the main valve actuations of the at least one engine valve for the de-activatable cylinder are prohibited.

Regardless, beginning at block 302, at least one cylinder of a plurality of cylinders is operated to provide positive power generation, i.e., according to main valve actuation events sufficient to support positive power generation in a fueled cylinder. As known in the art, such positive power operation may be provided by an otherwise de-activatable cylinder simply by controlling the relevant deactivators to operate in their activation state. Such operation of cylinders to provide positive power generation may occur at the time of engine startup (as in the case, for example, of seeking to warm the engine more quickly and the aftertreatment system) or during positive power generation of torque.

While the at least one cylinder is operating to provide positive power generation, processing continues at block 304, wherein it is determined whether one or more de-activatable cylinders need to be deactivated, i.e., to place the relevant deactivators 226, 228 in their respective deactivation states. Such a decision may be made in response to a determination that a certain set of conditions currently exist (as the case, for example, in which the engine controller determines that current vehicle speed and load provide an opportunity for reduced fuel consumption) or in response to an explicit request (as in the case, for example, of aftertreatment thermal management where it is possible to desirably increase exhaust aftertreatment temperatures through cylinder deactivation). Further, and despite the fact that step 302 is illustrated as occurring before step 304, the determination to deactivate cylinders at step 304 does not need to be conditioned on the cylinders having previously been in a positive power generation state (i.e., in an activation state). That is, the performance of steps 302 and 304 may be reversed. For example, it is known in the art to employ cylinder deactivation in diesel engines during cold engine startup.

Regardless, once it is determined that cylinder deactivation is required, processing continues at step 306 where the deactivators for the de-activatable cylinder(s) are placed in the deactivation state. For example, where the deactivators are implemented according to hydraulically-actuated locking/unlocking mechanisms as taught in the '824 patent, this may be achieved by controlling a corresponding hydraulic solenoid to provide pressurized hydraulic fluid to the deactivators such that the deactivators are unlocked/collapsed, and therefore capable of absorbing any valve actuation motions applied thereto.

Thereafter, at step 308, while deactivator(s) from step 304 are in the deactivation state and while the at least one cylinder from step 302 is operated to provide positive power generation, at least one secondary valve event is performed on the engine valve(s) for the deactivated cylinder. In a presently preferred embodiment, at least one secondary valve event is selected to cause an increase in exhaust gas temperature, but not at such a high level of work that the internal combustion engine is prevented from overall positive power generation. In another embodiment, the at least one secondary valve event is selected to alternatively or additionally achieve a desirable flow of gasses into and out of the cylinder, as in the case of IEGR. Various examples of such secondary valve events are described in further detail below. Where it is possible to select from more than one possible type of secondary valve event (an example of which is described in further detail below), such a selection may be based on comparison of one or more engine operating parameters (including, but not limited to, exhaust temperature, coolant temperature, oil temperature or aftertreatment system temperature) to corresponding thresholds.

At step 310, a determination is made whether to re-activate the previously-deactivated cylinders. In the case where the deactivated cylinders have been used, for example, to provide engine warmup or aftertreatment thermal management, such a determination may be made when any desired temperature levels have been achieved. Regardless, once the determination has been made to re-activate the cylinders, processing continues at step 312 where the one or more secondary valve events for the deactivated cylinders are discontinued. Thereafter, at block 314, the deactivators for the deactivated cylinder are placed in their activation state. Referring once again to the example of the hydraulically-actuated locking/unlocking mechanisms as taught in the '824 patent, this may be achieved by controlling the corresponding hydraulic solenoid to stop providing pressurized hydraulic fluid to the deactivators such that the deactivators are able to once again lock/uncollapse such that any valve actuation motions applied thereto are conveyed via the deactivator to the engine valves.

Figure 4:
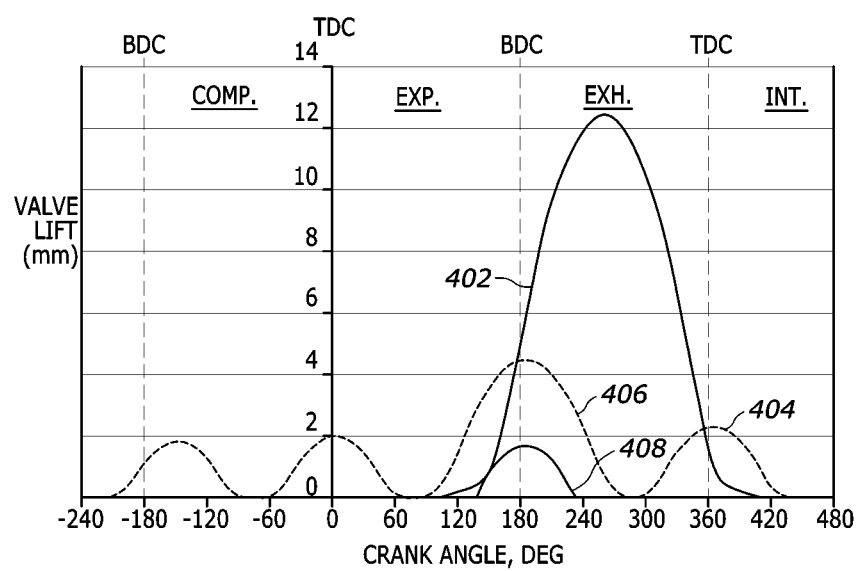
FIGS. 4-10 are graphs illustrating various examples of secondary valve events in accordance with the instant disclosure.

The provision of secondary valve events as described above may be achieved in a variety of manners. For example, and with reference to FIG. 4, a secondary valve event may be provided by a default lift provided by an auxiliary valve actuation motion source. In particular, FIG. 4 illustrates, in addition to a typical main exhaust valve event 402, a profile 404 of an auxiliary exhaust valve actuation motion source such at that taught in U.S. Pat. No. 8,936,006 ("the '006 patent") and U.S. Patent Application Publication No. 20140245992 ("the '992 application"), assigned to the instant Applicant, the teachings of which are incorporated herein by this reference. The profile 404, as taught in the '006 patent and the '992 application provides a number of valve actuations used to achieve two-stroke compression-release engine braking, including a default lift lobe 406. As known in the art, the valve actuations that would otherwise be provided by this profile 404 to the exhaust valve are normally lost (via suitable lost motion mechanisms disposed within the valve trains of the engine cylinders) during positive power operation of the engine. When engine braking is desired, positive power operation of the engine is discontinued (i.e., the cylinders are no longer fueled and main valve actuation motions 402 are lost) and the relevant lost motion mechanisms are controlled to provide the valve actuation motions of the auxiliary profile 404 to the exhaust engine valve(s).

However, unlike the other, lower lobes provided by the profile 404, the default lift lobe 406 has sufficient height such that it is not completely lost even when the relevant lost motion mechanisms are controlled to lose the motions provided by the profile 404. Stated another way, the lost motion mechanisms applicable to the auxiliary motion source profile 404 have a maximum amount of motion that they can absorb, and the height of the default lift lobe 406 is greater than that maximum amount of lost motion. The net consequence of this arrangement is that a default valve lift 408 is always provided to the exhaust valve by auxiliary motion source 404, even during positive power operation. However, during positive power operation, the presence of the default valve lift 408 is effectively "hidden" by the larger main exhaust valve actuation 402 and therefore has no effect on cylinder operation. The primary benefit of such a default lift 408 is to aid in the transition from positive power generation to engine braking where operation of the lost motion components to lose the main events 402 may occur relatively quickly, whereas the engine braking mechanisms may not be fully engaged for several engine cycles. Additional benefits of this default event 408 is to limit the peak pressure trapped in the cylinder in the event that the exhaust main event does not re-lock, or re-locks too slowly (during transition back from engine braking to positive power generation). This default lift 408 protects intake valve train components from excessive loading by ensuring evacuation of some of the cylinder pressure during the exhaust stroke under all circumstances. While the default lift 408 is inadequate to support proper combustion and positive power generation, it can reduce loads, transient noise and intake loading when turning on an engine brake.

In the context of the instant disclosure, the same techniques used to provide the default lift 408 may likewise be used to provide the secondary valve event(s) during operation of a deactivated cylinder. However, unlike the '006 patent and the '992 application, the default lift 408 is not provided during engine braking-only operation of the engine, but during a time when positive power operation is provided on some cylinders of the engine (e.g., step 302 described above) at the same time other cylinders are deactivated (with the secondary valve events; e.g., steps 306, 308). By controlling the shape and/or timing of the secondary valve events, various desirable effects may be achieved.

Figure 5:
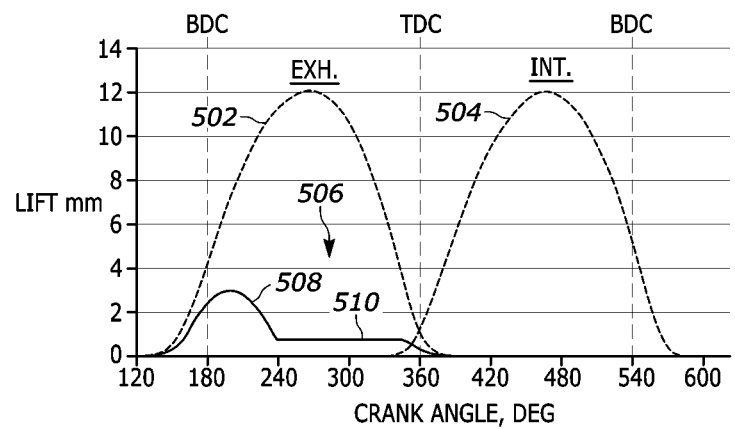

Referring now to FIG. 5, a first example of a secondary valve event 506 in accordance with the instant disclosure is shown, along with the main exhaust 502 and intake 504 valve events that are discontinued during cylinder deactivation. In particular, the secondary valve event 506 is applied to one or more exhaust valves and comprises two parts 508, 510. The first part 508, beginning shortly before BDC at the beginning of the exhaust stroke, is configured to draw air from a pressurized exhaust manifold back into the cylinder. The second part 510 is a reduced lift portion for the remainder of the exhaust stroke (similar to a bleeder engine braking valve lift, as known in the art) that permits the previously drawn-in exhaust gasses to be pressurized by the piston and expelled back into the exhaust manifold. It is noted that the entirety of the secondary valve event 506 is once again hidden by the main exhaust event 502. The work incurred by the pressurization of the previously drawn-in exhaust gasses during the second part 510 of the secondary valve event 506 increases the temperature of those gasses as they are expelled, thereby increasing the overall temperature of the exhaust system. For example, testing has shown that, in a six cylinder engine in which three cylinders are operated in positive power generation mode and three cylinders are operated in the deactivated state with the illustrated secondary valve event 506, an increase of approximately 38° C. can be achieved as compared to a comparable situation in which no secondary valve event 506 was employed.

Figure 6:
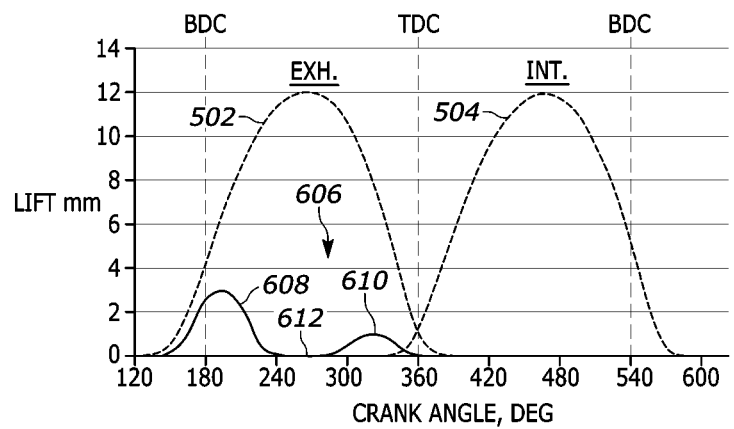

FIG. 6 illustrates a second example of a secondary valve event 606 in accordance with the instant disclosure. This second example 606 is similar to the first example 506 if FIG. 5 in that it includes two parts 608, 610 in which exhaust valve openings of different lifts are provided, but in this case, the first and second parts 608, 610 are separated by a third part 612 in which zero lift is provided. As with the first example secondary valve lift 506, the first part of the secondary valve lift 608 permits pressurized exhaust manifold gasses to be drawn back into the cylinder at the beginning of the exhaust stroke near BDC. The zero lift portion 612 of the second valve event 606 leads to an even greater increase in cylinder pressure as compared to the first example secondary valve lift 506. Thereafter the second part 610 of the secondary valve event 606 permits the increased pressure exhaust gasses to once again flow into the exhaust manifold near the TDC position at the end of the exhaust stroke. As in FIG. 5, this secondary valve event 606 absorbs work from the deactivated cylinder and releases the work as heat into the exhaust system. The various lifts of the first and second parts 608, 610 can be adjusted to create as much work as needed, for example, for warmup of the after treatment system during a cold engine startup.

Simulations have shown that the second part 610 of the secondary valve event 606 occurring near the end of the exhaust stroke could cause problems of high vacuum levels in a deactivated cylinder if not closing early enough to ensure some residual gas trapped in the cylinder. By having the second part 610 close a little before the end of the exhaust stroke (as compared, for example, to the end of the second part 510 in FIG. 5), undesirable vacuum levels in the cylinder can be avoided and still provide the thermal benefits.

Although the secondary exhaust valve events 506, 606 described above both occur during the piston's exhaust stroke, this is not a requirement; secondary valve events may also be provided during the piston's intake stroke. Where such a lift is provided for one or more intake valves during an intake stroke, fresh air from the intake manifold may be drawn into the deactivated cylinder to similarly supply gasses for a compression-release event (on the subsequently engine cycle) of the type detailed above in FIGS. 5 and 6 for one or more exhaust valves, or to prevent undesirably high vacuum levels from forming in the deactivated cylinder, and there is a new concept to facilitate EGR (exhaust gas recirculation). Additionally, the use of an intake-based secondary valve event may facilitate new types of beneficial gas flows through a deactivated cylinder.

As known in the art, during cylinder deactivation operation, the boost to backpressure ratio can be higher than desired and it is not possible to provide an adequate flow of exhaust gasses back to the intake manifold as part of exhaust gas recirculation (EGR) operation. The resulting lower-than-desired EGR rates may cause an increase in NOx emissions and may also diminish the benefits of cylinder deactivation. A method of moving exhaust gas from an exhaust manifold to an intake manifold can be achieved in-cylinder, commonly referred to as internal exhaust gas recirculation (iEGR) based on the techniques described herein.

During typical positive power operation of a cylinder, exhaust gas can be drawn into the cylinder during the intake stroke by opening an exhaust valve, or an intake valve can be opened during the higher pressure region of the exhaust stroke to push exhaust gas into the intake manifold, which exhaust gas is then later drawn back into the cylinder during the next intake event. However, in the case of secondary valve events that are "hidden" within the main event intake and exhaust, EGR operation can be provided in cylinder deactivation mode with a simple system of hidden lift events as described below.

Figure 7:
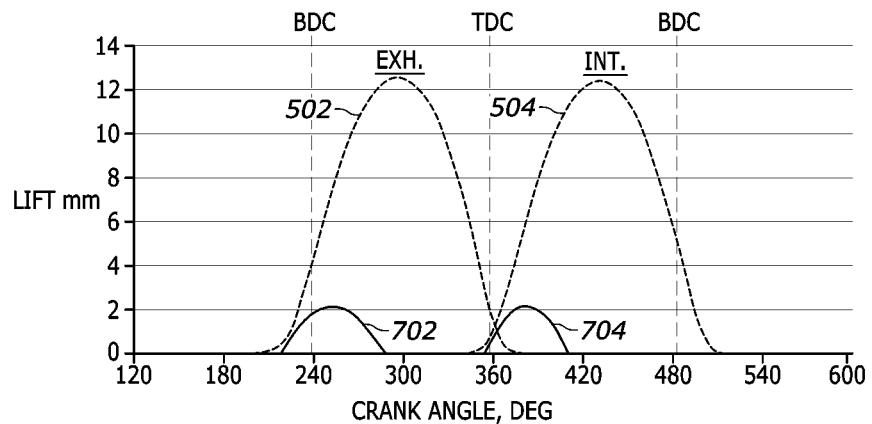

A third example secondary valve event that may be used to achieve iEGR is illustrated in FIG. 7. During the exhaust stroke of a deactivated cylinder, a first secondary valve event 702 for one or more exhaust valves can be timed to capture gas from the exhaust manifold in the cylinder in a similar manner to the first parts 508, 608 described above. In this case, however, during the subsequently intake stroke, a second secondary valve event 704 for one or more intake valves may be timed such that the trapped gas from the first secondary valve event 702 is released to the intake manifold. In this manner, the combined secondary valve events 702, 704 cause exhaust gasses to flow backwards from the exhaust manifold to the intake manifold thereby effectively providing EGR when the relative pressure of intake to exhaust would normally not permit adequate flow of EGR. An added potential benefit from this mode of operation is raise the temperature of the intake charge for warmup operation resulting from driving the hot exhaust gasses to the intake manifold. The second secondary valve event 704 can be timed to release the pressure at maximum cylinder pressure for maximum EGR rate and maximum work in the cylinder (as shown in FIG. 7), or it can be retarded (i.e., shifted to the right in FIG. 7 but still within the intake stroke) to reduce iEGR and work to optimize the requirements of a particular engine. Additionally, the pumping work performed in this manner increases the load on the system thereby aiding warmup when then engine is cold, and when loads are inadequate to raise the after-treatment temperature to a properly functioning range.

Figure 8:
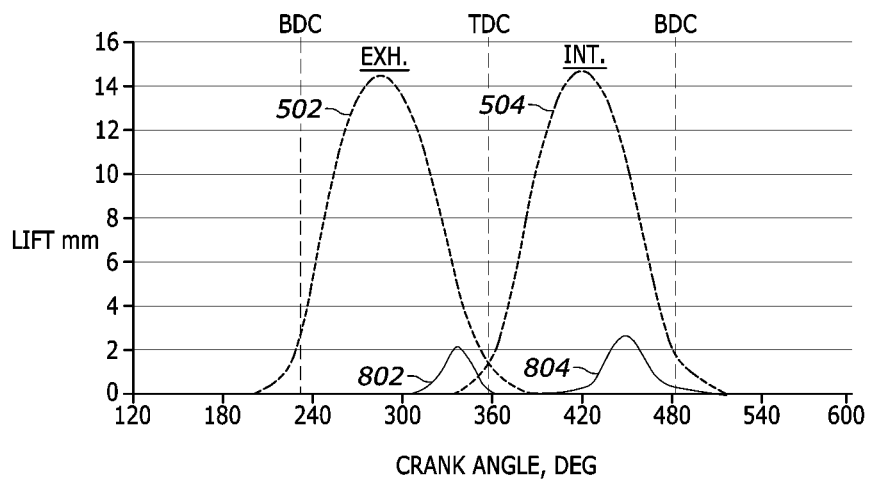

A fourth example secondary valve event (similar to the third example secondary valve event of FIG. 7) is illustrated in FIG. 8. As in FIG. 7, the fourth example secondary valve event comprises a first secondary valve event 802 for one or more exhaust valves that substantially occurs during the exhaust stroke and a second secondary valve event 804 for one or more intake valves that substantially occurs during the intake stroke. As shown, both the first and second secondary valve events 802, 804 occur near the end of their respective exhaust and intake strokes, though the location of the first and second secondary valve events 802, 804 may be varied. This results in a regulated intake of fresh air into the cylinder (during the second secondary valve event 804) and compression-release (during the first secondary valve event 802) with high power absorption by the deactivated cylinder. This can provide hot, oxygen-rich air to the exhaust to combine with hot exhaust gas from the other positive power generating cylinders. For example, in a six cylinder engine, three positive power generating cylinders may be provided to load the engine and create hot exhaust gasses, and three deactivated cylinders may be provided for loading against the positive power generating cylinders to increase the loading. This may be of particular use for aftertreatment regeneration, where high exhaust temperatures are employed to ensure proper operation of the aftertreatment system. As will be appreciated by those skilled in the art, the compression-release power absorption and the mass flow can be controlled in the design of the first and second secondary valve events 802, 804 to balance the mass required with the target temperature of the exhaust during regeneration mode.

Generally, a practical approach for applying secondary valve events as described herein is to use an engine braking (i.e., dedicated braking) cam and engine braking rocker arm to act on one or more exhaust valves. However, in some situations, it may be more reasonable and/or necessary to instead apply secondary valve events to one or more intake valves rather than exhaust valve.

Figure 9:
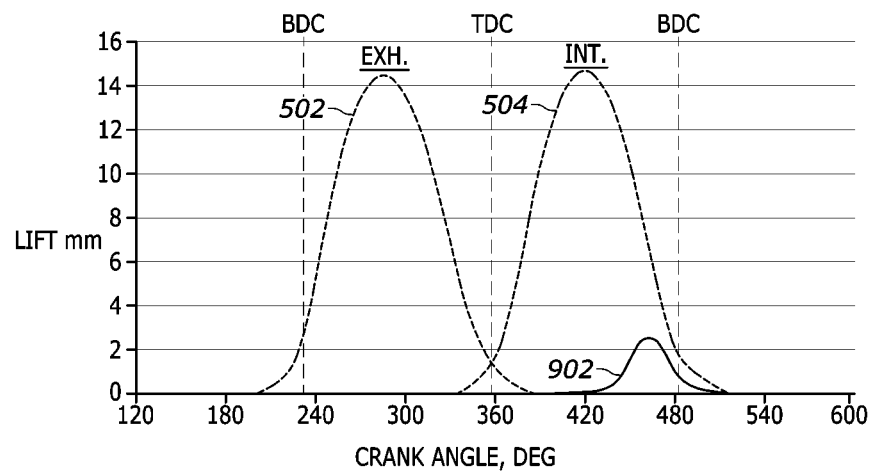
Figure 10:
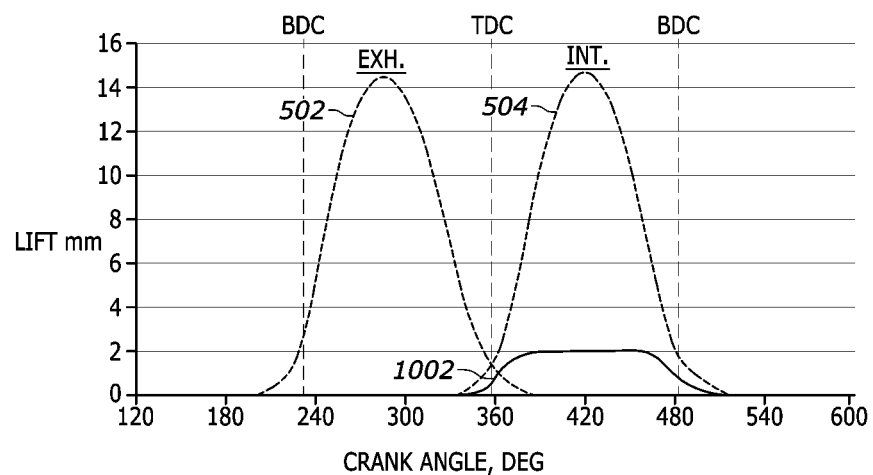

FIG. 9 illustrates a fifth example secondary valve event 902 that opens when the cylinder pressure is low, i.e., near BDC at the end of the intake stroke, and fresh air can be drawn into the cylinder to prevent vacuum during cylinder deactivation. An alternative sixth example secondary valve event 1002 is illustrated in FIG. 10, in which a first half of the secondary valve event 1002 (that portion closest to TDC of the intake stroke) provides a release of previously-compressed gasses from the cylinder back to the intake manifold, whereas a second half of the secondary valve event 1002 (that portion closest to BDC of the intake stroke) provides an opening to draw fresh air into the cylinder to prevent trapped vacuum and to provide a charge for the subsequent compression-release. The release of pressurized gasses into the intake manifold is sudden and turbulent resulting in mixing with the air in the intake manifold plenum, and the heat from the compressed gasses mixes with the fresh air that is provided to the other cylinders operating in positive power generation mode thereby facilitating the generation of additional heat. This cycle provided by the sixth example secondary valve event 1002 can be optimized to provide as little or as much compression-release work, or as much cylinder pressure as desired by adjusting the timing of opening and closing of the event, and possible re-closing (i.e., zero lift) between the first and second halves of the sixth example secondary valve event 1002 to reduce filling of the cylinder. The sixth example secondary valve event 1002 has an added benefit compared to a combined intake and exhaust secondary valve event (e.g., FIG. 8) because it can create heat-generating work without having a net mass flow from the deactivated cylinders. That is, the above-described combined intake and exhaust secondary valve events in FIG. 8 result in an increased mass flow through the cylinder which may reduce temperatures due to the cooling effect from the added mass.

Figure 11:
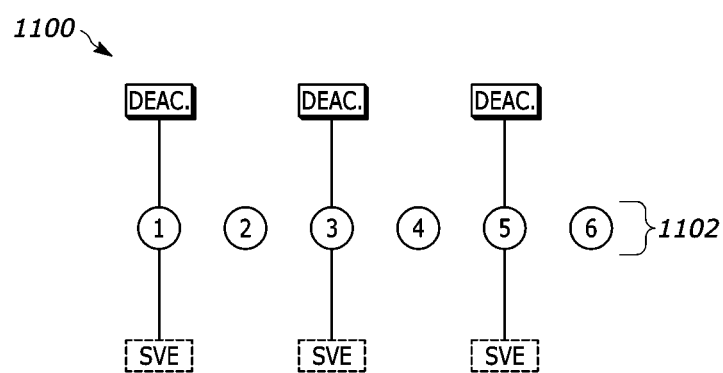
FIG. 11 is a schematic illustration of an inline, six-cylinder engine in accordance with an embodiment of the instant disclosure.

As described above, the provision of some cylinders operating in a positive power generation mode simultaneously with other, de-activatable cylinders each having at least one secondary valve event applied thereto can be schematically illustrated as shown in FIG. 11. In particular, FIG. 11 illustrates an inline engine 1100 comprising six cylinders 1102 in which three cylinders are operable in positive power generation mode (cylinders 2, 4 and 6) and the other three cylinders are de-activatable (cylinders 1, 3 and 5). As shown, each of the de-activatable cylinders has one or more deactivators associated therewith and further receives secondary valve events (SVE) as described above. However, it is appreciated that de-activatable cylinders can also be operated in positive power generation modes. Thus, by allowing every cylinder to be de-activatable, it becomes possible to provide multiple cylinder deactivation modes in which different types of secondary valve events on deactivated cylinders may be combined with cylinders operating in positive power generation mode.

An example of this is illustrated in FIG. 12 which once again schematically illustrates an inline engine 1200 having six cylinders 1202. In this case, each of the cylinders 1202 has one or more deactivators associated therewith such that all six cylinders may be operated in either a positive power generation mode or in a cylinder deactivation mode. As further shown, different groups of cylinders may be provided with different secondary valve events. In the illustrated example, there are two groups of cylinders differentiated by a first secondary valve event (SVE1) applicable to only a first group of cylinders (cylinders 1, 3 and 5 in the illustrated example) and a second secondary valve event (SVE2) applicable to only a second group of cylinders (cylinders 2, 4 and 6 in the illustrated example). Configured in this manner, two different cylinder deactivation strategies may be employed depending on specific needs. For example, SVE1 may be configured to maximize heat generation (as in the case of engine warmup or aftertreatment regeneration) whereas SVE2 may be configured to minimize load and therefore maximize fuel economy (as in the case of an already hot aftertreatment). In this case, when it is desired to employ maximum heat generation, the first group of cylinders is operated in cylinder deactivation mode with SVE1 applied thereto, whereas the second group of cylinders in operated in positive power generation mode. On the other hand, when it is desired to employ minimum loading/maximum fuel economy, the first group of cylinders is operated in positive power generation mode whereas the second group of cylinders in operated in cylinder deactivation mode with SVE2 applied thereto.

Figure 13:
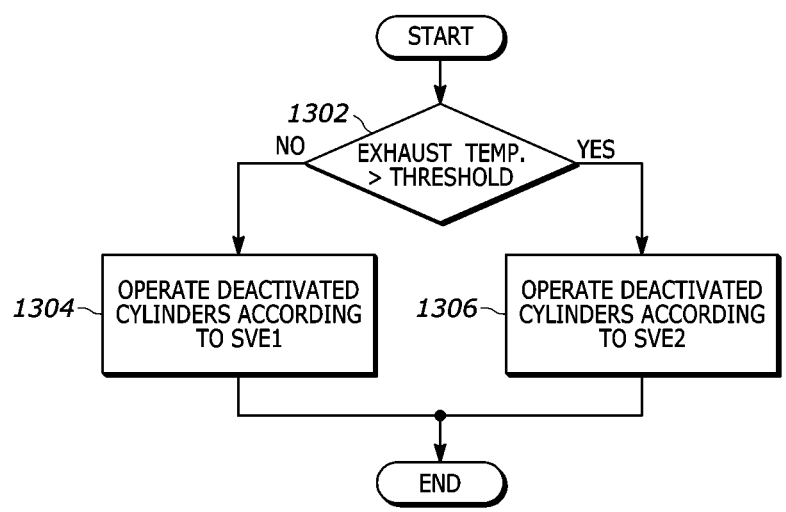
FIG. 13 is a flowchart illustrating a method for controlling engine valve actuations on an engine of the type illustrated in FIG. 12 in accordance with the instant disclosure.

Based on this strategy, an example of a control method is illustrated in FIG. 13, which would be implemented by an engine controller upon entry into cylinder deactivation mode of operating. In particular, at block 1302, it determined whether the exhaust temperature is above a certain threshold. For example, the threshold may be selected according to the exhaust temperature required to maintain an already-hot aftertreatment system. If the determination is made that the exhaust temperature does not exceed the threshold, processing may continue at step 1304 where the deactivated cylinders are operated such that SVE1 (maximum heat generation) is applied thereto. Alternatively, if the determination is made that the exhaust temperature does exceed the threshold, processing may continue at step 1306 where the deactivated cylinders are operated such that SVE2 (minimized load/maximum fuel economy) is applied thereto. Although the example of FIG. 13 is based on comparison of exhaust temperature to a threshold, it is appreciated that one or more other engine operating parameters could be equally employed. By way of non-limiting example, such engine operating parameters may include coolant temperature, oil temperature, aftertreatment system temperature, etc. In this manner, selective determination of which secondary valve event to use may be based on any of a number of engine parameters.

Figure 12:
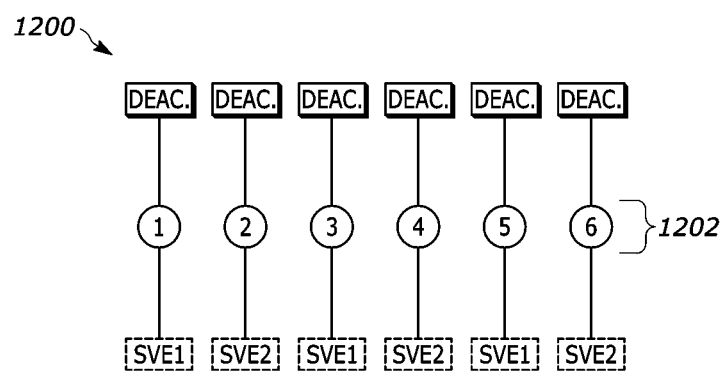
FIG. 12 is a schematic illustration of another inline, six-cylinder engine in accordance with an embodiment of the instant disclosure.

As a further strategy, the configuration illustrated in FIG. 12 may provide a "coasting mode" (i.e., in which the pistons of the engine are driven by the momentum of the vehicle as applied to the engine through the drive train) in which all cylinders would be deactivated for zero fuel consumption and minimum friction. To the extent that the secondary valve events may be selectively applied (or not) to a deactivated cylinder, some of the deactivated cylinders can be operated such that they have zero mass flow through the cylinders, as in the case where no secondary valve events are applied to such deactivated cylinders. On the other hand, others of the deactivated cylinders may be provided with secondary valve events that result in, for example, the re-circulation of exhaust gas in and out of the deactivated cylinder, thereby releasing heat into the exhaust system to keep the exhaust manifold, turbocharger, and neighboring components warm so transition back into positive power generation will not have a cold exhaust system.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

For example, as described above, the various secondary valve events may be implemented through the use of an auxiliary valve actuation motion source having "default" valve lifts that are always provided to the relevant engine valves but that are always "hidden" by main valve events, as taught in the '006 patent and the '992 application. However, it is appreciated that a more selectable version of an auxiliary valve actuation motion source, as opposed to an "always there" default valve event, may also be employed. Such selectability may be provided through the use of a suitable lost motion mechanism that loses all or a portion of auxiliary valve events when not selected, e.g., during positive power operation of a cylinder, but that provides the auxiliary (secondary) valve events when selected, such as during cylinder deactivation operation. Such a system, while necessarily more complex in order to provide the selectability functionality, also provides greater flexibility as to when secondary valve actuations may be used in conjunction with cylinder deactivation.

Furthermore, systems described herein for providing secondary valve events have been based on the use of an auxiliary valve actuation motion source (whether through "default" or selectable valve events). However, this need not be a requirement to the extent that secondary valve events may be derived from main valve events. For example, so-called "centered" valve events are reduced-lift versions of main valve events that are provided through the use of lost motion components (such as the deactivators described above) that are only capable of losing an amount of lift less than a peak lift provided by the main valve actuations. For example, if a given main valve lift has a peak lift of 14 mm, but the deactivator disposed in the corresponding valve train has a deactivation stroke length of 10 mm, the valve train will still provide a 4 mm lift centered on the peak lift portion of the main valve event, which 4 mm lift could be employed as a secondary valve event in some circumstances.

It is also noted that the various secondary valve events illustrated herein may employed so-called on- and off-ramps, i.e., transition regions at the respective start and end of a given secondary valve event, that are designed to control engine valve velocity to ensure smooth lifting and seating of the engine valves.

In addition to the functionality described above, the secondary valve events may also be used to generate a minimum mass flow level necessary to maintain turbo charger speeds above a threshold to permit turbocharger bearings to be properly supported on an oil film, and to improve transient turbo response to sudden load demand increases.

Further still, the instant disclosure above has described the various secondary valve events as being provided only during the exhaust and intake strokes, i.e., that they are "hidden" within the main valve events. However, it is appreciated that this is not a requirement as it would be possible to also or alternatively incorporate substantially similar secondary valve events (during cylinder deactivation operation) during the expansion and/or compression strokes of the engine to the extent that the exhibit similar "intake" and "exhaust" properties by virtue of having the same downward and upward motion of the piston.

What is claimed is:

1. A method for actuating engine valves in an internal combustion engine comprising a plurality of cylinders,
   each of the plurality of cylinders comprising at least one engine valve and having at least one main valve actuation motion source associated with the cylinder, wherein the at least one main valve actuation motion source is configured to provide main valve actuations to the at least one engine valve via at least one valve train, where such main valve actuations are sufficient to support positive power generation by the cylinder, and
   wherein the plurality of cylinders includes at least one de-activatable cylinder, each of the at least one de-activatable cylinder having at least one auxiliary valve actuation motion source configured to always provide valve actuation motions to the at least one engine valve via the at least one valve train for the de-activatable cylinder, and having at least one deactivator assembly operatively connected to the at least one valve train for the de-activatable cylinder, each of the at least one deactivator assembly configured to operate in either an activation state in which the main valve actuations of the at least one engine valve for the de-activatable cylinder are permitted or a deactivation state in which the main valve actuations of the at least one engine valve for the de-activatable cylinder are prohibited, wherein the valve actuation motions provided by the at least one auxiliary valve actuation motion source comprise at least one secondary valve event that is hidden by the main valve actuations during the activation state of the at least one deactivator assembly, the method comprising:

operating at least one cylinder of the plurality of cylinders to provide positive power generation according to the main valve actuations;

placing the at least one deactivator assembly for a de-activatable cylinder of the at least one de-activatable cylinder in the deactivation state; and while the at least one deactivator assembly for the de-activatable cylinder is in the deactivation state and while the at least one cylinder is operating to provide positive power generation according to the main valve actuations, performing the at least one secondary valve event, provided by the at least one auxiliary valve actuation motion source, via an exhaust valve of the at least one engine valve for the de-activatable cylinder, wherein the at least one secondary valve event is configured to draw in exhaust gasses from an exhaust manifold of the internal combustion engine into the de-activatable cylinder and expel the exhaust gasses from the de-activatable cylinder back into the exhaust manifold.

2. The method of claim 1, wherein the at least one deactivator assembly for the de-activatable cylinder, in the deactivation state, loses an amount of lift less than a peak lift provided by the main valve actuations, and wherein the at least one secondary valve event is provided by the main valve actuations via the at least one deactivator assembly for the de-activatable cylinder.

3. The method of claim 1, wherein the at least one secondary valve event is determined based on one or more engine operating parameters including exhaust temperature, coolant temperature, oil temperature or aftertreatment system temperature.

4. The method of claim 1, wherein the at least one de-activatable cylinder comprises a first de-activatable cylinder and a second de-activatable cylinder, and wherein the at least one secondary valve event comprises a first secondary valve event applicable to only the first de-activatable cylinder and a second secondary valve event, different from the first secondary valve event, applicable to only the second de-activatable cylinder, the step of placing the at least one deactivator assembly for the de-activatable cylinder in the deactivation state further comprises placing the at least one deactivator assembly for either the first or the second de-activatable cylinder in the deactivation state; and the step of performing the at least one secondary valve event via the at least one engine valve for the de-activatable cylinder further comprises performing the first secondary valve event via the at least one engine valve for the first de-activatable cylinder or the second secondary valve event via the at least one engine valve for the second de-activatable cylinder.

5. The method of claim 4, wherein the step of performing the at least one secondary valve event further comprises selecting either the first secondary valve event or the second secondary valve event based on one or more engine operating parameters including exhaust temperature, coolant temperature, oil temperature or aftertreatment system temperature.

6. The method of claim 1, further comprising:

while the at least one deactivator assembly for the de-activatable cylinder is in the deactivation state and while the at least one cylinder is operating to provide positive power generation according to the main valve actuations, performing at least one additional secondary valve event, provided by the at least one auxiliary valve actuation motion source, via the at least one engine valve for the de-activatable cylinder, wherein the at least one additional secondary valve event is not hidden by the main valve actuations during the deactivation state of the at least one deactivator assembly and wherein the at least one additional secondary valve event is configured to draw in additional exhaust gasses from an exhaust manifold of the internal combustion engine into the de-activatable cylinder and expel the additional exhaust gasses from the de-activatable cylinder back into the exhaust manifold.

7. The method of claim 1, wherein the at least one secondary valve event comprises first and second non-zero lift secondary valve events with a period of zero valve lift between the first and second non-zero lift secondary valve events.

* * * * *